Nov. 24, 1936.  L. C. HUCK  2,061,629
RIVET
Filed July 20, 1933  2 Sheets-Sheet 1
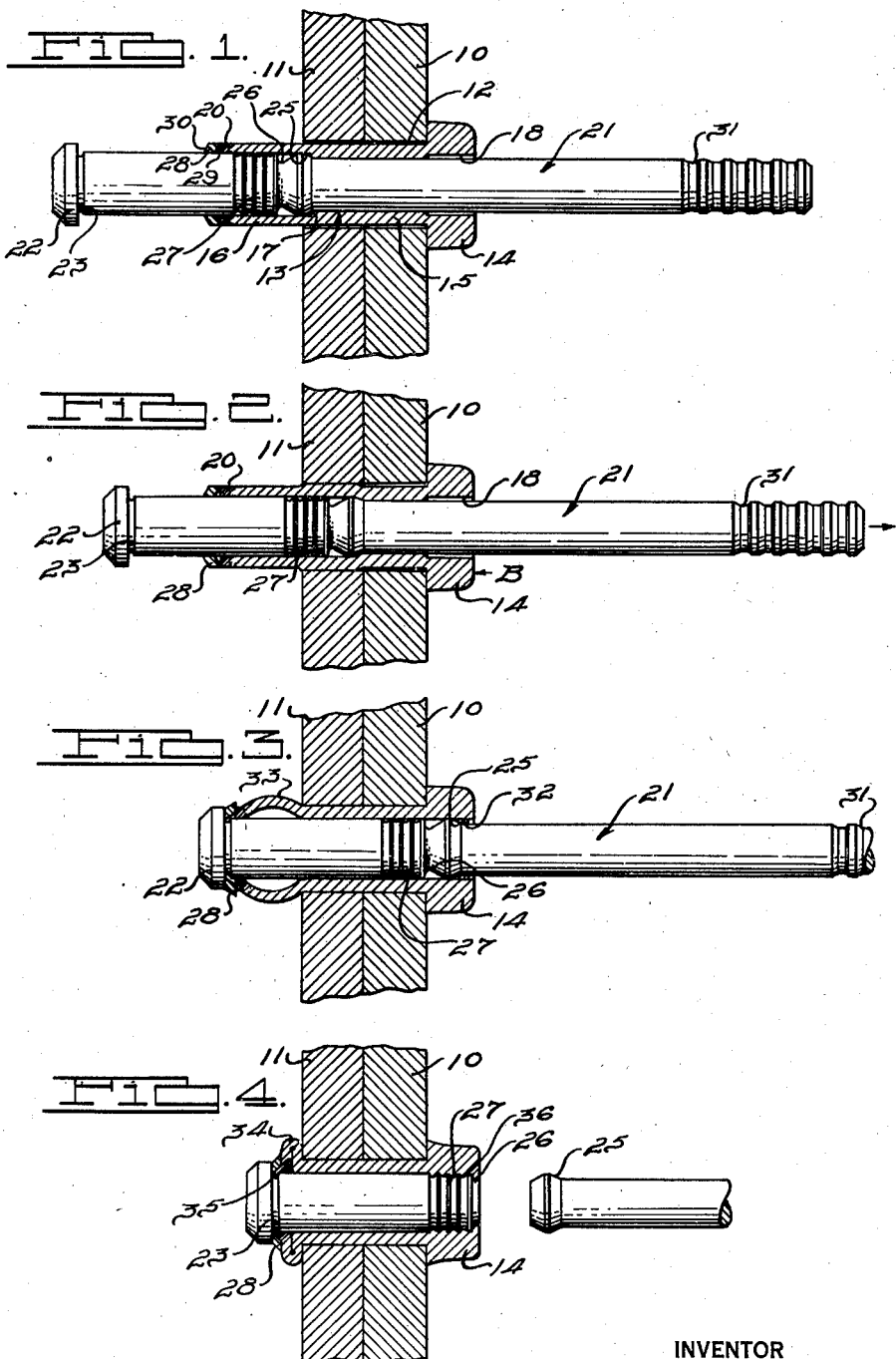
INVENTOR
Louis C. Huck.
BY
Harness, Dickey, Pierce & Hann
ATTORNEYS.

Nov. 24, 1936.          L. C. HUCK          2,061,629
                          RIVET
               Filed July 20, 1933      2 Sheets-Sheet 2
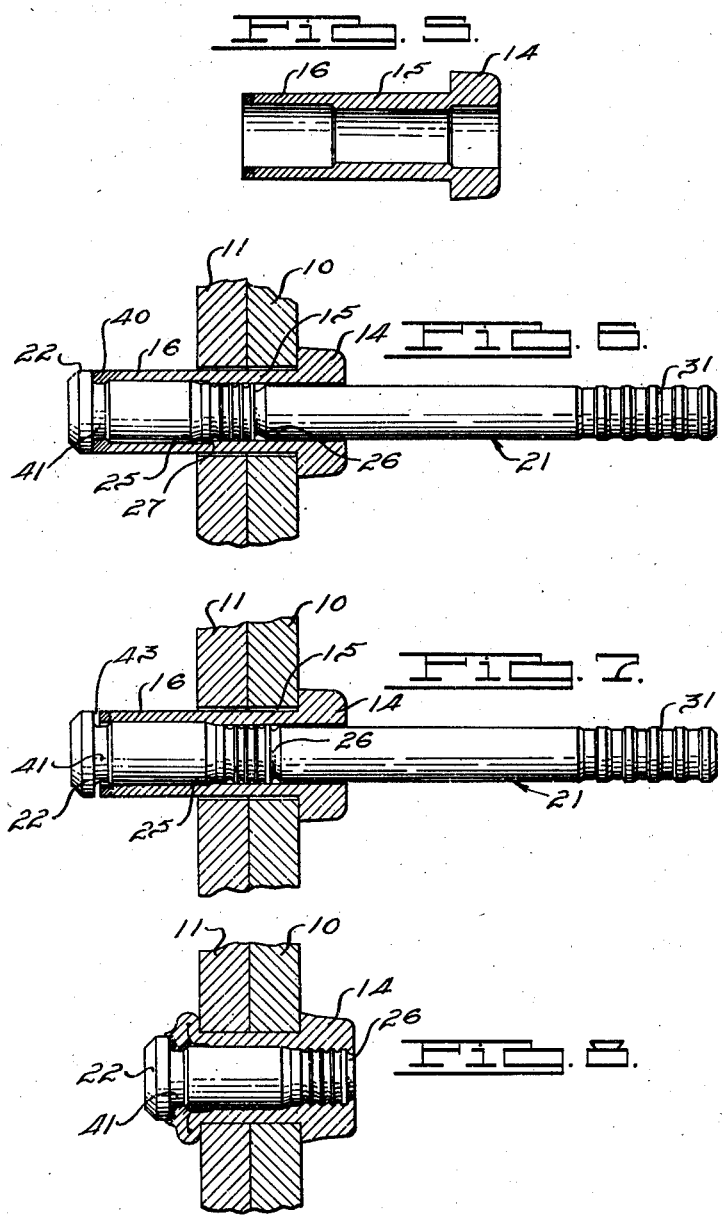
INVENTOR
Louis C. Huck.
BY
Harness, Dickey, Pierce & Hann
ATTORNEYS.

Patented Nov. 24, 1936

2,061,629

UNITED STATES PATENT OFFICE 2,061,629

RIVET

Louis C. Huck, Grosse Pointe Village, Mich., assignor to Huxon Holding Corporation, Detroit, Mich., a corporation of Michigan Application July 20, 1933, Serial No. 681,362

53 Claims. (Cl. 85—40)

The invention relates to fastening devices and it has particular relation to a rivet and a method of riveting.

The type of rivet to which the invention particularly relates comprises a tubular member and a pin having a relatively high tensile strength. This pin at one end has a head for engaging the adjacent end of the tubular member and projects through the tubular member and beyond the other end thereof. The latter end of the tubular member, preferably is initially formed with a head for engaging the structure to be riveted and the tubular body and the head on the pin are of such dimensions that they may be inserted through openings in the structure to be riveted from one side thereof, until the head on the tubular member engages the structure. Then by pulling the projecting end of the pin and applying the reactionary force to the head on the tubular member, the head on the pin will cause an annular and outward expansion of the tubular body projecting beyond the opposite side of the structure to form an annular and bulbed head. Following formation of the bulbed head, continued tension on the pin breaks it at a breakneck so located in the pin that after formation of the bulbed head it substantially coincides with the outer side of the head on the tubular member.

It will be appreciated in a rivet of this character, that in initially inserting the rivet assembly through the openings in the structure to be riveted, there must be some clearance between the outer surface of the tubular body and the openings in the structure to facilitate this insertion. In setting the rivet, it therefore becomes important that the part of the tubular body within the openings be expanded to eliminate any clearances or other interstices so as to provide not only a sealed connection, but a connection which will positively prevent relative movement of the structural elements that are riveted, in a direction transversely of the rivet length. Also, and as particularly brought out in my co-pending application for patent Serial No. 627,343, filed August 3, 1932, it is highly advantageous, following formation of the annular and bulbed head and prior to breaking of the pin, that the pin and tubular member at that end opposite the bulbed head be positively interlocked. This interlocking of the pin and tubular member following formation of the bulbed head and before breaking of the pin at the breakneck, is advantageous particularly in preventing recoil forces on the pin following breaking thereof, from causing a loosening of the pin and permitting resilient return movement of the bulbed head and slight loosening thereof with respect to the structure.

According to said co-pending application mentioned, this interlocking between the pin and tubular member is effected by means of grooves in the outer surface of the pin and located adjacent to but inwardly of the breakneck, which are filled by metal in the head on the tubular member during use of riveting setting apparatus which causes such radial upsetting of the head that some metal therein flows into the grooves during the final part of the riveting operation and immediately prior to breaking of the pin. A rivet setting machine for setting a rivet of this character and for locking the pin and tubular member prior to breaking the pin is disclosed in the co-pending application of Huck et al., Serial No. 636,480, filed October 6, 1932.

One object of the present invention is to provide a rivet and method of riveting which are of such character that the openings in the structure being riveted will positively be filled regardless of varying factors such as misalignment of the openings, while still obtaining a desirably formed and bulbed head and desirable relation of the pin and tubular member in the completed rivet connection.

Another object of the invention is to provide an improved rivet wherein the effective size of the head portion on the pin is substantially increased during the riveting operation to the end that there will be less tendency for a movement of the head through the bulbed portion of the tubular member owing to the greater area of contact between the head on the pin and the end of the tubular member adjacent the bulbed head.

Another object of the invention is to provide a rivet and method of riveting wherein clearances and other interstices between the tubular member and openings in the structure being riveted are definitely filled prior to application of forces acting to form the bulbed head, from which it follows that a simultaneous and accumulative application of these forces is not required.

Another object of the invention is to provide a rivet and method of riveting which enables removal of surplus metal in the tubular member that is not necessary to fill interstices, and to eliminate this surplus metal without interferring with the final rivet connection.

Other objects of the invention will become apparent from the following description, the drawings relating thereto and the claims hereinafter set forth.

For a better understanding of the invention, reference may be had to the accompanying drawings forming a part of the specification, wherein:

Figure 1 is a cross-sectional view of a structure to be riveted, having a rivet inserted therein constructed according to one form of the invention, with the rivet assembly illustrated prior to the rivet setting operation.

Fig. 2 is a view similar to Fig. 1 illustrating an initial phase in the rivet setting operation.

Fig. 3 is a similar view illustrating an advanced stage of the rivet setting operation.

Fig. 4 is a similar view illustrating the rivet connection after completion of the rivet setting operation.

Fig. 5 is a cross-sectional view of the portion 16 of the tubular member having different strainhardening characteristics.

Fig. 6 is a cross-sectional view similar to Fig. 1, but illustrating another form of the invention.

Fig. 7 is a similar cross-sectional view and illustrating another form of the invention.

Fig. 8 is a view illustrating substantially how either of the rivets shown by Figs. 6 and 7 appears after it is set.

Referring to Fig. 1, the structure to be riveted may comprise plates 10 and 11 having openings 12 for receiving the rivets. The rivet comprises a tubular member 13 which has a head 14 adapted to engage the outer side of the plate 10. The metal in the head 14 may be strainhardened by upsetting the metal in forming it and the side wall of the head may be tapered at a slight angle for a purpose which will be mentioned hereinafter. The tubular member includes a portion 15 substantially equal to but preferably slightly less in length to the length of the openings 12, and a portion 16 projecting from plate 11, which is substantially equal in outside diameter to that of the portion 15 but which has a larger inside diameter, or in other words, a thinner wall. This construction provides an annular and internal shoulder indicated at 17 at the junction of the portions 15 and 16. The inner peripheral surface of the head 14, as indicated at 18, corresponds in diameter to the inner diameter of portion 16 and hence is of greater diameter than the inner peripheral surface of the portion 15. At its outer end, the portion 16 of the tubular member may have a sector, indicated at 20, which may be inherently reinforced by cold working of the metal, for example.

The rivet also includes a pin 21 extending through the tubular member 13 and the inner end of the pin has a head 22 substantially equal in outside diameter to that of portions 15 and 16 of the tubular member, and an annular groove 23 in the outer surface of the pin adjacent the head. As the assembled parts are illustrated, from the groove 23 substantially to the shoulder 17 on the tubular member, the pin has an over-all or outside diameter substantially the same as that of the inner surface of the portion 16 of the tubular member, whereas from such shoulder 17 to the opposite end of the pin, the outer diameter of the latter substantially corresponds to. the inner diameter of the portion 15 of the tubular member. It will be noted that as the parts are arranged, the head 22 on the pin is considerably spaced from the outer end of the tubular portion 16. Adjacent the shoulder 17 on the tubular member the pin is provided with a tapered shoulder 25 which terminates in that portion of the pin located in the portion 15 of the tubular member, from which it will be seen that upon any movement of the pin through the tubular member in a direction to the right, the shoulder 25 will engage the shoulder 17 and begin to radially expand the portion 15.

Adjacent the shoulder 25 and at the side thereof next to the head 22 on the pin, the latter has an annular break-neck or groove 26, the diameter of which is such that this part of the pin will break before any other part, and adjacent the breakneck, the pin is provided with several locking grooves or recesses 27, the depth of which is less than the breakneck 26. The pin is also provided with an annular spreader ring or collar 28 substantially equal in outside diameter to that of the portion 16 of the tubular member, and as initially formed and disposed on the pin, the ring has substantially axial inner and outer walls and side walls 29 and 30 disposed in parallel relation and at an angle to the axis of the pin and to the side of the head 22 and end face of the tubular portion 16. This ring may have a slight press fit on the pin and normally will be located as shown during manufacture of the rivet. The opposite end of the pin is provided with a number of grooves or threads 31 by means of which the pin may be gripped by jaws in a riveting machine as embodied in my application for patent previously mentioned.

The tubular member is composed of metal relatively ductile as compared to the pin, while the latter has a high tensile strength. The spreader ring is composed of metal harder than the tubular member but is ductile relative to the pin.

Referring to Figs. 2 and 3 the initial step in setting the rivet is effected through exerting a pull on the pin as indicated at A by using the riveting machine adapted to grip the threaded portion 31 of the pin, and a primary anvil adapted to apply the reactionary force of the pull against the outer face of the head as indicated at B. This results in a movement of the pin through the tubular member, and since the head 22 on the pin is substantially spaced from the end of the portion 16 of the tubular member, the initial action that is obtained is a movement of the shoulder portion 25 of the pin through the portion 15 of the tubular member. This causes a radial expansion of this portion of the tubular member which acts to fill the openings in the plates 10 and 11 around the tubular member and thus to eliminate any clearances or other interstices. The arrangement of the pin and tubular member is such that this shoulder 25 will substantially move through the portion 15 of the tubular member before the spreader ring 28 is moved by head 22 against the reinforced end 20 of the tubular portion 16. Thus the initial step deals with filling the openings in the structure being riveted in a complete and forceful manner by radially outward movement of the tubular wall in such openings. Owing to variations in the size of the openings in structures and possible slight variations in dimensions, there may be a surplus of metal during this initial expanding operation, and this surplus of metal is pushed ahead of the shoulder and moved through the head 14 on the tubular member. It is evident that the larger opening 18 in the head 14 provides a space around the pin for allowing any excess metal ahead of the shoulder 25, as well as the latter, to be moved to the exterior of the head. While this excess metal may not always be present, it is illustrated in Fig. 3 at 32.

As continued and forceful pull on the pin occurs, the ring 28 partially turns about its annular center or median line so as to twist the inclined walls 29 and 30 of the ring from generally conical shape into positions substantially normal to the axis of the pin. When in such twisted positions, the wall 30 has face contact with the adjacent side wall of the head 22 while the wall 29 has substantially face contact with the end 20 on the tubular portion. It will be appreciated that this twisting of the ring causes it to increase in over-all outside diameter and thus to provide a larger abutment for engaging the end of the tubular member. In this connection it should be realized that this increase in effective abutment area cannot be obtained until insertion of the rivet, owing to the fact that the openings in the structure being riveted limit the size of the assembly to be inserted. As pull is continued on the pin the portion 16 of the tubular member begins to form into a bulb as indicated at 33, and as this pull is continued, an annular bulbed head 34 is formed as shown in Fig. 4.

The strainhardened portion 20 on the end of the tubular portion 16 increases its resistance to bursting or expansion and causes formation of the bulbed head and insures that the end of the portion 16 adjacent the head 22 will be maintained in contact with the pin while the intermediate portion is outwardly expanded. During final formation of the bulb head, part of the metal in the extreme end of the tubular portion 16 may flow under the ring 28 and into the annular groove 23 thereby providing a lock against relative axial movement of the pin and tubular member at this end of the rivet.

When the bulbed head 34 is formed, as shown in Fig. 4, the locking grooves 27 are located within the axial length of the head 14 on the tubular member, while the breakneck 26 is located substantially at the outer face of the head. When the rivet setting operation is at this stage, it is apparent that increased resistance will be presented to further movement of the pin, as the head 34 is now formed, and a movement of the pin farther toward the right is strongly resisted. With the use of the rivet setting machine illustrated in the application for patent previously mentioned, increased tension now applied to the pin automatically causes a secondary anvil to move over the slightly tapered outer periphery of the head 14 and to radially compress it and reduce its over-all diameter. This causes metal in the head 14 to flow into the grooves 27 and simultaneously increases the axial length of the head, thereby not only locking the head to the pin, but actually increasing the tension on the latter. Thus a further tightening of the plates is effected. This metal in the head 14 may initially be strainhardened as previously stated, and/or strainhardened to some extent by the action of the second anvil. Thus a stronger metal will flow into the locking grooves. A further and increased tension on the pin finally becomes sufficient to break it at the breakneck 26, thus separating the pin from the rivet connection substantially at the outer side of the head. Interlocking of the head with the pin at this end of the rivet prevents the recoil force following breaking of the pin, from moving that part of the pin in the rivet connection toward the left or allowing the pin to so move as a result of this recoil force in conjunction with the natural and resilient tendency of the bulbed head 34 to revert toward its unbulbed condition. It has been found that by preventing this reverse movement of the pin, a tighter connection is effected, and furthermore, the pin is more effective in conjunction with the tubular member to absorb any tensile forces on the rivet.

Fig. 5 illustrates a tubular member of different construction in that the portion 16 has a gradient of strainhardening which is greater at the outer end of the portion and gradually decreases toward the portion 15 of the tubular member. Preferably this portion also terminates in an end sector which is still further strainhardened. The gradient of strainhardening and the end sector mentioned are indicated by cross hatching and shading. Providing the greatest strainhardening at the outer end insures the greater resistance to bursting of this part of the tubular member in forming the bulbed head, while the gradually decreasing strainhardening toward the portion 15 is useful in controlling the manner in which the bulb forms and particularly in locating the region wherein bulbing is initiated. The construction enables initiating bulbing nearer to the structure being riveted and this is advantageous in obtaining a tightening of the plates 10 and 11.

This rivet is designed particularly to function satisfactorily through normal variations in hole size and even normal variations in alignment of holes in the structure to be riveted. In setting one rivet, the hole may be of such size or shape that no surplus metal will result after expanding the tubular portion 15 whereas in other cases surplus metal will occur. For the rivet to function in the latter case, the counterbore in head 14 must be provided to allow surplus metal to be pushed therethrough in front of shoulder 25. Under conditions where surplus metal will result or even where the holes are misaligned, the expansion of portion 15 may require considerable force and if bulbing of the portion 16 occurred at the same time, the accumulative force might be so great as to break the pin at the breakneck before the bulbed head actually forms.

The spreader ring 28 in increasing the effective size of head 22, prevents the latter from burying deeply in the bulbed head or even passing therethrough. This ring is desirable particularly where the size of hole is such that the expansion of portion 15 leaves no surplus metal and frictional resistance to continued movement of the pin is relatively small. Under such conditions, the expanded spreader ring provides a larger abutment to withstand the forces required to swage head 14 and break the pin and thereby prevents burying of the head on the pin in the bulbed head or movement through the latter. The spreader ring also may be designed to expand after the bulbed head is formed as it is at this time the increased abutment area is particularly desired.

The locking grooves 27 are located to the left of the shoulder 25 on the pin so as to be in the larger pin portion. When the bulbed head is formed and the grooves are within the head 14, the space to be filled by swaging the head is not undesirably large and the swaging anvil readily may upset the metal into the grooves.

During expansion of the portion 15, some axial movement of head 14 to the right may occur when there is surplus metal and in fact some of the surplus metal may actually escape through the extrusion of the tubular portion. This extrusion of the tubular portion 15 and movement of head 14 may occur notwithstanding the engagement of the anvil with the head, and this seems to be effected by multiplication of forces through engagement of the tapered shoulder 25 on the pin with the portion 15. In this event, the secondary anvil will not only force metal into the grooves 27 but also will axially extrude the metal in the head into engagement with the structure riveted, thereby tightening the latter.

The rivets shown by Figs. 6 and 7 both have tubular portions 15 adapted to be expanded by the shoulder on the pin, but are advantageous where the space behind the structure or behind plate 11 is smaller and a rivet as shown by Fig. 1 could not be used because of its longer projecting portion. The rivets shown by Figs. 6 and 7 are also advantageous in that less pin length is used and less is wasted. In either rivet it is necessary to avoid the large space between the head 22 on the pin and the end of the tubular portion 16 and it follows that to finally locate the grooves 27 within head 14 on the tubular member, such grooves must initially be to the right of shoulder 25 as they must be within the head upon completion of the bulbing operation. Locating the grooves 27 to the right of shoulder 25 and hence in the smaller portion of the pin practically precludes using a counterbore in the head 14 as it would be very difficult to reduce the diameter of the counterbore sufficiently to flow metal into the grooves.

It follows from the above, that these rivets may be set satisfactorily where the openings in the structure being riveted are held to closer tolerances and where there is less misalignment so that there will be little or no surplus metal resulting from expanding tubular portion 15.

Also in either rivet it is not desirable to move shoulder 25 into head 14 and expand the latter and it follows that the shoulder must initially be spaced to the left of the head a distance at least equal to the movement of the pin required during formation of the bulbed head. Since the inner end of the portion 16 is disposed slightly inward of the outer surface of plate 11, it is apparent then that a space between the shoulder 25 and the beginning of portion 15 must be provided, where the thickness of both plates, or the structure riveted, is less than the movement of the pin required to form the bulbed head. The rivet shown by Fig. 6 is adapted for this condition where the thickness of structure is less than the pin movement in the bulbing operation, and in this rivet the pin may be locked to the end of the tubular portion as shown, where the pin has a groove 41 and the portion 16 has a thicker portion 40 projecting into the groove. Preferably, the thickened portion 40 is strainhardened and a gradient of cold working may also be used in portion 16 as shown in Fig. 5. This arrangement would avoid use of a spreader ring even if the openings in the structure tend to the oversize.

Where the thickness of the structure riveted is greater than the distance the pin moves in the riveting operation, the head 22 will be spaced from the end of the tubular portion 16 with the shoulder 25 against the end of tubular portion 15, as shown by Fig. 7, so that the shoulder will be spaced to the left of head 14 a distance at least equal to the movement of the pin in setting the rivet. Then the expanding of portion 15 will begin before bulbing of portion 16 begins, but when the rivet is set, the shoulder 25 will not have moved into head 14. Preferably the portion 16 will have a gradient of cold working as shown also by Fig. 5, and a spreader ring may be used between head 22 and the end of the portion 16, particularly where the openings in the structure tend toward the oversize. It may be noted that normally the end of portion 16 in the rivet shown by Fig. 7 will not flow into the groove in the pin adjacent head 22 until the bulb is formed and flows better into the groove, if the gradient of cold working is present.

Fig. 8 illustrates the final rivet connection which may be obtained by using either of the rivets shown by Figs. 6 and 7.

In general, it is to be understood that the first rivet illustrated by Figs. 1 to 5 is more generally adapted and may function satisfactorily even though hole sizes vary and even though misalignment is present. The rivets shown by Figs. 6 and 7 are particularly adapted for holes which are held to closer tolerances and are more nearly aligned. While the latter are perhaps not as generally applicable, they are advantageous in certain cases such as where the extent the rivet may initially project behind the structure is limited. Also, in either of the rivets shown by Figs. 6 and 7 there is a smaller length of pin wasted.

The manner of manufacturing rivets such as illustrated and described forms the subject-matter of a separate application, Serial No. 681,438, filed July 21, 1933, in the names of Louis C. Huck and Will E. Morris.

Although more than one form of the invention has been illustrated and described in detail, it will be apparent to those skilled in the art that various modifications may be made without departing from the scope of the appended claims.

What I claim is:

1. A rivet, as an article of manufacture, comprising a tubular member having a portion adapted to be disposed in openings in a structure to be riveted, and a portion of larger inside diameter adapted to project from one side of the structure and to be formed into an annular, bulbed head, a pin extending through the tubular member and beyond the outer end of the projecting portion thereof, means on the pin and spaced from said outer end of the projecting portion of the tubular member for engaging the latter and forming the bulbed head after a predetermined movement of the pin through the tubular member, and means on the pin for radially expanding the first mentioned portion of the tubular member when the pin is initially moved through the latter.

2. A rivet, as an article of manufacture, comprising a tubular member having a portion adapted to be disposed in openings in a structure to be riveted, and a portion of larger inside diameter adapted to project from one side of the structure and to be formed into an annular, bulbed head, a pin extending through the tubular member and beyond the outer end of the projecting portion thereof, means on the pin and spaced from said outer end of the projecting portion of the tubular member, for engaging the latter and forming the bulbed head after predetermined movement of the pin through the tubular member, and means on the pin and located substantially at the junction of the two portions of the tubular member for radially expanding the first mentioned portion when the pin is initially moved through the tubular member.

3. A rivet comprising a tubular member adapted to be enlarged by axial forces to form a head, a pin extending through the tubular member and having a head for applying axial force to one end of the latter so as to form such head, and a separate ring between such head and the adjacent end of the latter, said ring being expandible radially upon the application of said axial force.

4. A rivet comprising a tubular member adapted to be enlarged by axial forces to form a head, a pin extending through the tubular member and having a head for applying axial force to one end of the latter so as to form such head, and means separate from said end of the member and head on the pin but located between them and being expansible radially upon application of said axial force.

5. A rivet comprising a tubular member adapted to be enlarged by axial forces to form a head, a pin extending through the tubular member and having a head for applying axial force to one end of the latter so as to form such head, and a separate concave ring on the pin between said head and the end of the tubular member and which is adapted to radially expand upon the application of said axial force.

6. A rivet comprising a tubular member adapted to be enlarged by axial forces to form a head, a pin extending through the tubular member and having a head for applying axial force to one end of the latter, and a separate ring between the head and end of the tubular member and having side wall portions directed at an angle to the axis of the pin and to a plane radial with respect to the axis, said side wall portions being adapted to deform toward radial plane positions so as to increase the outside diameter of the ring upon application of said axial forces.

7. A rivet as an article of manufacture comprising a tubular member, a pin extending through the tubular member, means on one end of the pin for applying axial forces to the adjacent end of the tubular member upon movement of the pin through the member, means on an intermediate portion of the pin for effecting radial expansion of a portion of the tubular member upon such movement of the pin, and means effecting a weaker section in the pin between said two means on the pin to enable breakage of the pin by tension.

8. A rivet comprising a tubular member having a portion adapted to be disposed in openings in a structure to be riveted and a portion to project beyond one side of the structure, a pin extending through the tubular member, means on the pin for engaging the outer end of the projecting portion of the tubular member and applying axial force thereto when the pin is moved through the tubular member, and means for effecting radial expansion of the first mentioned portion of the tubular member upon such movement of the pin, without affecting the projecting portion of the tubular member.

9. A rivet comprising a tubular member, a pin extending through the tubular member, means on one end of the pin for applying axial forces to one end of the tubular member, means on the pin for effecting outward expansion of an intermediate portion of the tubular member during movement of the pin therethrough, and recess means on the pin adjacent the last mentioned means for receiving extended portions of the tubular member adapted to lock the pin and member against relative longitudinal movement.

10. A rivet comprising a tubular member, a pin extending through the tubular member, means on one end of the pin for applying axial forces to one end of the tubular member, means on the pin for effecting outward expansion of an intermediate portion of the tubular member during movement of the pin therethrough, and recess means on the pin adjacent the last mentioned means for receiving extended portions of the tubular member, said recess means being located between the two first-mentioned means on the pin.

11. A rivet as an article of manufacture, comprising a tubular member adapted to project through an opening in a structure to be riveted and beyond both sides of the structure, a pin extending through the tubular member and having a shoulder for radially expanding that portion of the member to be disposed in the opening upon moving the pin through the tubular member and applying the reactionary force to one end of the tubular member, and means comprising a space between the pin and said last mentioned projecting end of the tubular member for allowing metal in the tubular member above that required to fill the opening in the structure to extrude along the pin in front of the shoulder and into said last mentioned projecting end of the tubular member.

12. A rivet as an article of manufacture, comprising a tubular member, adapted to project through an opening in a structure to be riveted and beyond both sides of the structure, a pin extending through the tubular member and having a shoulder for radially expanding that portion of the member to be disposed in the opening upon moving the pin through the tubular member and applying the reactionary force to one end of the tubular member, and means for allowing metal in the tubular member above that required to fill the opening in the structure to extrude along the pin in front of the shoulder and into said last mentioned projecting end of the tubular member, said means comprising an enlarged opening in said projecting end of the tubular member.

13. A rivet as an article of manufacture, comprising a tubular member adapted to project through an opening in a structure to be riveted and having a head at one end for engaging one side of the structure and a portion adapted to project beyond the opposite side of the structure and to be formed into a head, a pin extending through the tubular member, means on the pin for engaging the end of the last mentioned portion of the tubular member when the pin is moved through the latter and the reactionary force is applied to the head on the tubular member, a shoulder on the pin for engaging that portion of the tubular member to be disposed in the opening in the structure, to force the metal in such portion radially and outwardly to fill the opening in the structure, and means providing a space in the head on the tubular member between it and the pin, for receiving surplus metal resulting from said radial movement of the metal to fill the opening.

14. A rivet as an article of manufacture, comprising a tubular member having an end portion and an adjacent portion of smaller internal diameter, a pin extending through the tubular member and having a portion of larger diameter than the smaller internal diameter of the tubular member and disposed within said end portion of the tubular member, and means on one end of the pin for engaging the end face of the end portion of the tubular member.

15. A rivet as an article of manufacture, comprising a tubular member having an end portion and an adjacent portion of smaller internal diameter, a pin extending through the tubular member and having a portion of larger diameter than the smaller internal diameter of the tubular member and disposed within said end portion of the tubular member, and means on one end of the pin for engaging the end face of the end portion of the tubular member, said means initially being axially spaced from said end face.

16. A rivet as an article of manufacture, comprising a tubular member having an end portion and an adjacent portion of smaller internal diameter, a pin extending through the tubular member and having a portion of larger diameter than the smaller internal diameter of the tubular member and disposed within said end portion of the tubular member, a head on the end of the pin adjacent the end portion of the tubular member, and a radially expansible collar on the pin adjacent the head for engaging the end portion of the tubular member when the pin is moved through the tubular member.

17. A rivet comprising a tubular member, a pin extending through the tubular member, a head on one end of the pin, and a collar on the pin between the head and one end of the tubular member, said collar being adapted to engage the end of the tubular member when the pin is moved through the latter and being composed of metal more ductile than the tubular member and less ductile than the pin.

18. A rivet comprising a tubular member having a head on one end, an intermediate body portion and an opposite end portion of larger internal diameter, a pin extending through the tubular member and having a portion of larger diameter than the internal diameter of the intermediate body portion of the tubular member and disposed in said end portion of the tubular member, and a plurality of grooves in the peripheral surface of said larger portion of the pin.

19. A rivet comprising a tubular member having a head on one end, an intermediate body portion and an opposite end portion of larger internal diameter, a pin extending through the tubular member and having a portion of larger diameter than the internal diameter of the intermediate body portion of the tubular member and disposed in said end portion of the tubular member, and a plurality of grooves in the peripheral surface of said pin adjacent the inner end of the larger portion of the pin.

20. A rivet as an article of manufacture, comprising a tubular member having an end portion and an adjacent portion of smaller internal diameter, a pin extending through the tubular member and having a portion of larger diameter than the smaller internal diameter of the tubular member and disposed within such end portion of the tubular member, and means on the pin engaging the end face of the first mentioned portion, said means on the pin being initially spaced from the end of the second portion of the tubular member.

21. A rivet comprising a tubular member having a portion adapted to be disposed within openings in a structure to be riveted and a portion adapted to project beyond one side of the structure and to be bulbed into a head by axially directed forces, said portion to be bulbed having a part progressively strain hardened in an axial direction so as to govern the bulbing action.

22. A rivet comprising a tubular member having a portion adapted to be disposed within openings in a structure to be riveted and a portion adapted to project beyond one side of the structure and to be bulbed into a head by axially directed forces, said portion to be bulbed being substantially of uniform wall thickness and having, in an axial direction, a progressively increasing resistance to bulbing so as to govern the bulbing action.

23. A rivet as an article of manufacture comprising a tubular member, a pin extending through the tubular member and having a head on one end, a shoulder on the pin located within the tubular member and adapted to expand a portion of the latter radially when the pin is pulled through the member, said pin having a groove adjacent the shoulder for causing the pin to break at the point of location of the groove when the pin is tensioned sufficiently and means comprising one or more relatively shallow grooves in the pin between the shoulder and the first groove for locking a portion of the tubular member to the pin.

24. A rivet as an article of manufacture comprising a tubular member, a pin extending through the tubular member and having a head on one end, and a shoulder on the pin located within the tubular member for expanding a part of the latter radially when the pin is pulled, said pin having a groove in its outer surface between said head and said shoulder.

25. A rivet as an article of manufacture comprising a tubular member, a pin extending through the tubular member and having a head on one end, and a shoulder on the pin located within the tubular member for expanding a part of the latter when the pin is pulled, said pin having a plurality of grooves adjacent the shoulder, one of which has a greater depth than the others for causing the pin to break when sufficiently tensioned, the other grooves being adapted to lock a portion of the tubular member to the pin.

26. A rivet comprising a tubular member having a portion adapted to be disposed in openings in a structure to be riveted and a portion adapted to project from one side of the structure and to be bulbed into a head, a pin extending through the tubular member, means on one end of the pin for applying axial force to the end of the tubular portion to be bulbed when the other end of the pin is pulled and the other end of the tubular member is held against movement, means on the pin for expanding that part of the tubular member adapted to be disposed in the openings in the structure, and means on the pin for locking the latter to said other end of the tubular member after the pin is pulled sufficiently to cause formation of the bulbed head, said last mentioned means being located adjacent the expanding means of the pin.

27. A rivet comprising a tubular member having a portion adapted to be disposed in openings in a structure to be riveted and a portion adapted to project from one side of the structure and to be bulbed into a head, a pin extending through the tubular member, means on one end of the pin for applying axial force to the end of the tubular portion to be bulbed when the other end of the pin is pulled and the other end of the tubular member is held against movement, means on the pin for expanding that part of the tubular member adapted to be disposed in the openings in the structure, and means on the pin for locking the latter to said other end of the tubular member after the pin is pulled sufficiently to cause formation of the bulbed head, said first mentioned means and the expansion means on the pin initially being so located as to obtain expansion of the tubular portion in the structural openings prior to formation of the bulbed head.

28. A rivet comprising a tubular member having an intermediate portion adapted to be radially expanded to fill openings in a structure and a portion adapted to project from the structure, and a pin projecting through the tubular member and having a shoulder located within the tubular member for expanding said intermediate portion.

29. A rivet comprising a tubular member having a portion adapted to be disposed in openings in a structure to be riveted and an end portion adapted to project beyond one side of the structure and to be formed into a head for engaging such side of the structure, a pin extending through the tubular member, means on the pin for engaging such end portion of the tubular member when the pin is moved towards the opposite end of the member, and means on the pin for radially expanding substantially only the first mentioned portion of the member when the pin is moved, so as to increase the diameter of such portion for the purpose of filling the opening in the structure to be riveted.

30. A rivet comprising a tubular member having a portion adapted to be disposed in openings in a structure to be riveted and an end portion adapted to project beyond one side of the structure and to be formed into a head for engaging such side of the structure, a pin extending through the tubular member, means on the pin for engaging such end portion of the tubular member when the pin is moved towards the opposite end of the member, and means on the pin for radially expanding substantially only the first mentioned portion of the member when the pin is moved, so as to increase the diameter of such portion for the purpose of filling the opening in the structure to be riveted, said pair of means on the pin being so arranged that expansion of the first portion of the pin will be initiated before the head on the tubular member is formed.

31. A rivet comprising a tubular member having a portion adapted to be disposed in openings in a structure to be riveted and an end portion adapted to project beyond one side of the structure and to be formed into a head for engaging such side of the structure, a pin extending through the tubular member, means on the pin for engaging such end portion of the tubular member when the pin is moved towards the opposite end of the member, and means on the pin for radially expanding substantially only the first mentioned portion of the member when the pin is moved, so as to increase the diameter of such portion for the purpose of filling the opening in the structure to be riveted, said pair of means on the pin being so arranged that expansion of the first portion of the pin will be effected substantially throughout the length of the portion prior to initial formation of the head on the member.

32. A rivet comprising a tubular member having a head at one end for engaging one side of a structure to be riveted, a portion adapted to be disposed in openings in the structure, and an end portion of larger internal diameter as compared to that of the first portion and which is adapted to project beyond the opposite side of the structure and to be bulbed into a head by axial forces directed against opposite ends of the member, a pin extending through the tubular member and beyond the head on the tubular member to provide a gripping portion, means on the other end of the pin for applying axial forces against the opposite end of the tubular member, and means on the pin for radially enlarging the first mentioned portion of the member to fill the openings in the structure when the gripping portion of the pin is pulled and the reactionary force is applied to the head on the tubular member.

33. A rivet comprising a tubular member having a head at one end for engaging one side of a structure to be riveted, a portion adapted to be disposed in openings in the structure, and an end portion of larger internal diameter as compared to that of the first portion and which is adapted to project beyond the opposite side of the structure and to be bulbed into a head by axial forces directed against opposite ends of the member, a pin extending through the tubular member and beyond the head on the tubular member to provide a gripping portion, means on the other end of the pin for applying axial forces against the opposite end of the tubular member, and means on the pin for radially enlarging the first mentioned portion of the member to fill the openings in the structure when the gripping portion of the pin is pulled and the reactionary force is applied to the head on the tubular member, said last mentioned means comprising a shoulder on the pin which is of greater diameter than the initial inside diameter of said first mentioned portion of the pin.

34. A rivet comprising a tubular member having a head at one end for engaging one side of a structure to be riveted, a portion adapted to be disposed in openings in the structure, and an end portion of larger internal diameter as compared to that of the first portion and which is adapted to project beyond the opposite side of the structure and to be bulbed into a head by axial forces directed against opposite ends of the member, a pin extending through the tubular member and beyond the head on the tubular member to provide a gripping portion, means on the other end of the pin for applying axial forces against the opposite end of the tubular member, and means on the pin for radially enlarging the first mentioned portion of the member to fill the openings in the structure when the gripping portion of the pin is pulled and the reactionary force is applied to the head on the tubular member, said last mentioned means comprising a shoulder on the pin which is of greater diameter than the initial inside diameter of said first mentioned portion of the pin and which is movable through the second mentioned and end portion of the member substantially in a free manner.

35. A rivet comprising a tubular member having a head at one end for engaging one side of a structure to be riveted, a portion adapted to be disposed in openings in the structure, and an end portion of larger internal diameter as compared to that of the first portion and which is adapted to project beyond the opposite side of the structure and to be bulbed into a head by axial forces directed against oposite ends of the member, a pin extending through the tubular member and beyond the head on the tubular member to provide a gripping portion, means on the other end of the pin for applying axial forces against the opposite end of the tubular member, and a shoulder on the pin for enlarging the tubular portion of smaller diameter, said pin between said means and the shoulder having a portion of substantially the same diameter as that of the shoulder and which is adapted to move into and fill the opening in the first mentioned portion of the tubular member when the rivet is set by pulling the gripping portion of the pin and applying the reactionary force to the first mentioned head on the tubular member.

36. A rivet comprising a tubular member having a head at one end for engaging one side of a structure to be riveted and being adapted to project through openings in the structure and having an end portion adapted to project beyond the opposite side of the structure and to be bulbed into a head by axially compressive forces directed against opposite ends of the member, a pin extending through the tubular member and having a gripping portion projecting beyond said first head, a head on the pin adapted to apply axial forces against the free end of said end portion of the member, and a spreader ring on the pin between the head on the latter and said end portion of the member and which is adapted to increase in radial dimensions when axial forces are directed against opposite ends of the member by pulling the gripping portion of the pin and applying the reactionary force to the first head on the tubular member.

37. A rivet comprising a tubular member having a head at one end for engaging one side of a structure to be riveted and being adapted to project through openings in the structure and having an end portion adapted to project beyond the opposite side of the structure and to be bulbed into a head by axially compressive forces directed against opposite ends of the member, a pin extending through the tubular member and having a gripping portion projecting beyond said first head, a head on the pin adapted to apply axial forces against the free end of said end portion of the member, a spreader ring on the pin between the head on the latter and said end portion of the member and which is adapted to increase in radial dimensions when axial forces are directed against opposite ends of the member by pulling the gripping portion of the pin and applying the reactionary force to the first head on the tubular member, and means inherent in the free end of such end portion of the tubular member and increasing its resistance to outward expansion as compared to the remainder of the end portion.

38. A rivet comprising a tubular member having a head at one end for engaging one side of a structure to be riveted and being adapted to project through openings in the structure and having an end portion adapted to project beyond the opposite side of the structure and to be bulbed into a head by axially compressive forces directed against opposite ends of the member, a pin extending through the tubular member and having a gripping portion projecting beyond said first head, a head on the pin adapted to apply axial forces against the free end of said end portion of the member, and a spreader ring on the pin between the head on the latter and said end portion of the member and which is adapted to increase in radial dimensions when axial forces are directed against opposite ends of the member by pulling the gripping portion of the pin and applying the reactionary force to the first head on the tubular member, said spreader ring and head on the pin having a diameter not greater than the diameter of that portion of the tubular member insertable in the openings in the structure so as to enable inserting and setting the rivet from one side of the structure.

39. A rivet as an article of manufacture, comprising a tubular member adapted to project through an opening in a structure to be riveted and beyond both sides of the structure, a pin extending through the tubular member and having a shoulder for radially expanding that portion of the member disposed in the opening upon moving the pin through the tubular member and applying the reactionary force to one end of the tubular member, and means for substantially preventing deformation of the last-mentioned end of the tubular member by any axial movement of metal in advance of the shoulder.

40. A rivet as an article of manufacture, comprising a tubular member adapted to project through an opening in a structure to be riveted and beyond both sides of the structure, a pin extending through the tubular member and having a shoulder for radially expanding that portion of the member disposed in the opening upon moving the pin through the tubular member and applying the reactionary force to one end of the tubular member, and means for allowing the shoulder to move into the last-mentioned end of the tubular member without any substantial deformation of said end.

41. A rivet as an article of manufacture comprising a tubular member adapted to project through an opening in a structure to be riveted and having a head at one side of the structure, a pin extending through the tubular member and having a shoulder for radially expanding that portion of the member disposed in the opening upon moving the pin through the tubular member and applying the reactionary force to said head, and means for substantially preventing any displacement or deformation of the head by axial movement of metal in advance of the shoulder.

42. A rivet comprising a tubular member having a portion adapted to be disposed in openings in a structure to be riveted, a head on one end of the member and adapted to engage one side of the structure, a portion at the other end of the member adapted to project beyond the opposite side of the structure and to be expanded into a head, a pin extending through the tubular member, and means on the pin for expanding both of said portions of the tubular member when the pin is moved through the member, the arrangement being such that expansion of the first portion is initiated prior to expansion of the second portion.

43. A rivet comprising a tubular member having a portion adapted to be disposed in openings in a structure to be riveted, a head on one end of the member and adapted to engage one side of the structure, a portion at the other end of the member adapted to project beyond the opposite side of the structure and to be expanded into a head, a pin extending through the tubular member, and separate means on the pin for independently expanding each of said portions respectively when the pin is moved through the member.

44. A rivet comprising a tubular member having a portion adapted to be disposed in openings in a structure to be riveted, a head on one end of the member and adapted to engage one side of the structure, a portion at the other end of the member adapted to project beyond the opposite side of the structure and to be expanded into a head, a pin extending through the tubular member, and separate means on the pin for expanding each of said portions respectively when the pin is moved through the member and being so related and arranged that expansion of the portions is initiated in a predetermined order and each of said means expands only one of said portions.

45. A rivet comprising a tubular member having a portion adapted to be disposed in openings in a structure to be riveted, a head on one end of the member and adapted to engage one side of the structure, a portion at the other end of the member adapted to project beyond the opposite side of the structure and to be expanded into a head, a pin extending through the tubular member, shoulder means on the pin for radially expanding only the first portion of the member when the pin is moved therethrough, and separate means for expanding the second portion during movement of the pin.

46. A rivet adapted to be inserted and set from one side of a structure to be riveted, comprising a tubular member, a pin extending through the tubular member and having a head for applying axial forces to one end of the tubular member, and a spreader ring on the pin between said head and the adjacent end of the tubular member and being adapted to increase in diameter upon application of axial forces thereto, the ring, head on the pin and tubular member being initially of such dimensions as to pass through the opening in the structure to be riveted.

47. A rivet comprising a tubular member having an intermediate portion adapted to be radially expanded to fill openings in a structure, and a portion adapted to extend from the structure, and a pin projecting through the tubular member and having a shoulder freely slidable in the extending portion of said member and adapted to expand said intermediate portion.

48. A rivet comprising a tubular member having an intermediate portion adapted to be radially expanded to fill openings in a structure and a portion adapted to project from said structure, and a headed pin projecting through said tubular member and having a shoulder spaced from the head of said pin a distance substantially equal to the axial length of said tubular member.

49. A rivet comprising a tubular member having an intermediate portion adapted to be radially expanded to fill openings in a structure, a headed pin projecting through said member and having a shoulder within said member for expanding said portion, and means in the shank of said pin between said shoulder and the head thereof providing for breaking of said pin therebetween upon setting of said rivet.

50. A rivet comprising a tubular body having a head at one end for engaging one side of a structure to be riveted and being adapted at its opposite end to project through an opening in the structure and to be enlarged by axial forces into a head, a pin projecting through the body member and having a head on the end adjacent said opposite end of the body, and a separate means between the head on the pin and said opposite end of the body adapted to expand when the pin is pulled to effect enlargement of said opposite end of the body into a head.

51. A rivet comprising a tubular body having a head at one end for engaging one side of a structure to be riveted and being adapted at its opposite end to project through an opening in the structure and to be expanded by axial forces into a head, a pin projecting through the body member and having a head on the end adjacent said opposite end of the body, and separate means between the head on the pin and said opposite end of the body adapted to expand when the pin is pulled to effect expansion of said body into a head adjacent said opposite end while preventing outward movement of the defining edge of said opposite end.

52. The combination with a tubular member having a head on one end and being adapted at its opposite end to be expanded by axial forces into a head, of a cylindrical member extending through said tubular member and having a head thereon adjacent the opposite end of the tubular member, and separate radially expansible means positioned between the head on the cylindrical member and said opposite end of the tubular member, said tubular member from said head thereon to its opposite end, the head on the cylindrical member and said expansible means being of substantially the same external diameter whereby they may be inserted through an opening in a structure to be riveted and thereafter the projecting end of the tubular member may be deformed by an axial pull applied to the cylindrical member and effective through the head thereof and the expansible means, upon said opposite end of the tubular member.

53. In combination, a tubular member having an end portion adapted to extend through an opening and to be enlarged by axial forces into a head, cylindrical means extending through said tubular member and having a head adjacent said end portion of the tubular member of substantially the same diameter as the outside diameter of said tubular member, and a separate dished annular member surrounding the cylindrical means between the head thereof and the adjacent end of the tubular member, said dished member being initially of substantially the diameter of said head and being adapted to expand radially when flattened.

LOUIS C. HUCK.